Nov. 22, 1938.       H. W. PRICE ET AL                2,137,544
                  CLUTCH CONTROL MECHANISM
                  Filed Oct. 14, 1935          2 Sheets-Sheet 1

INVENTOR.
HAROLD W. PRICE
EARL R. PRICE
BY
ATTORNEY

Patented Nov. 22, 1938

2,137,544

UNITED STATES PATENT OFFICE 2,137,544

CLUTCH CONTROL MECHANISM

Harold W. Price and Earl R. Price, South Bend, Ind., assignors to Bendix Products Corporation, South Bend, Ind., a corporation of Indiana Application October 14, 1935, Serial No. 44,850

2 Claims. (Cl. 192—.01)

This invention relates in general to clutches, and more particularly to power means for operating the clutch of an automotive vehicle.

One object of the invention is to provide a valvular control for a power clutch mechanism whereby the clutch is engaged relatively rapidly and uniformly up to the point of clutch plate contact, the remainder of the engagement being in successive relatively small increments of movement to thereby effect a slipping clutch and a smooth engagement.

A further object of the invention is to provide an accelerator controlled automatic clutch mechanism wherein release and depression of the accelerator initiate respectively clutch disengaging and engaging operations of the mechanism, the degree of depression of the accelerator determining the rate of engagement of the clutch.

Yet another object of the invention is to provide a compact valvular unit for the aforementioned automatic clutch mechanism, said unit comprising four ported and slotted parts, two of which are manually operated.

Further objects of the invention and desirable details of construction and combinations of parts will become apparent from the following description of a preferred embodiment, which description is taken in conjunction with the accompanying drawings, in which.

Figure 1:
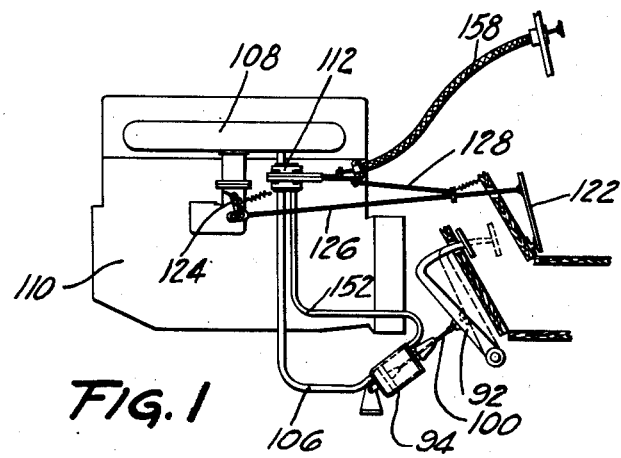
Figure 1 is a diagrammatic view of a power clutch mechanism of the two-stage type employing a novel four-part valvular unit constituting a feature of the invention.
Figure 2:
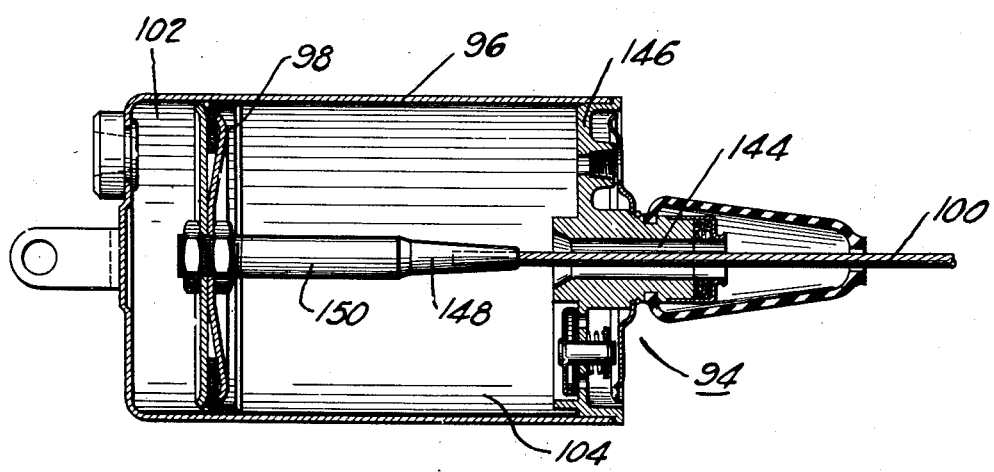
Figure 2 is a sectional view of the clutch motor of the mechanism of Figure 1.
Figure 8:
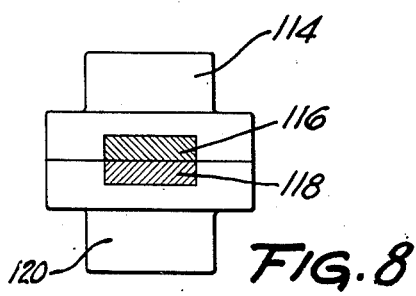
Figure 8 is a sectional view of the valve unit taken on the line 8—8 of Figure 3.
Figure 3:
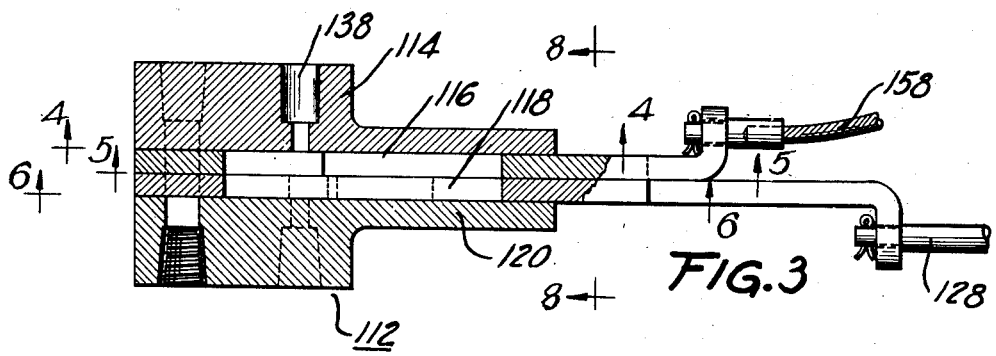
Figure 3 is a longitudinal sectional view of the valve unit of Figure 1.
Figure 4:
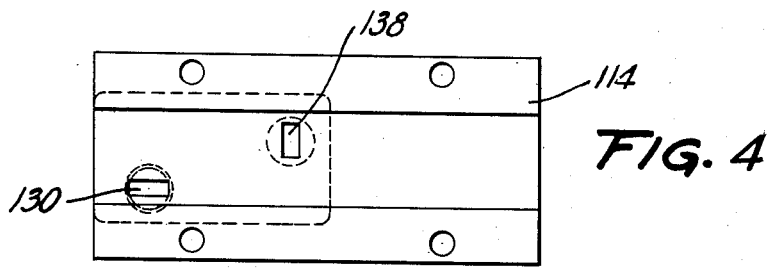
Figure 4 is a view taken on the line 4—4 of Figure 3.
Figure 5:
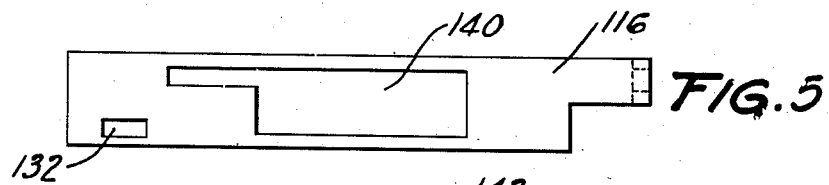
Figure 5 is a view taken on the line 5—5 of Figure 3, disclosing the cut-off slide of the aforementioned valve unit.
Figure 6:
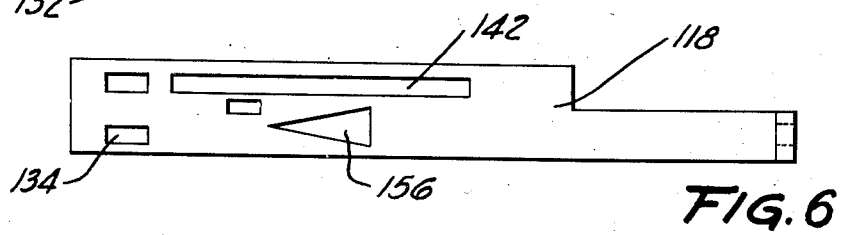
Figure 6 is a view taken on line 6—6 of Figure 3, showing the accelerator operated control slide of the aforementioned valve unit.
Figure 7:
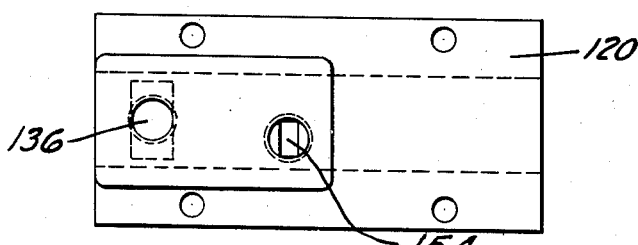
Figure 7 is a bottom plan view of the aforementioned valve unit.

In the embodiment of the invention disclosed in Figure 1, a clutch pedal 92 is adapted to be actuated by power means to simulate a conventional manual operation of the clutch. The power means disclosed comprises a pressure differential operated motor 94 including a cylinder 96 and a piston 98, Figure 2, the latter being operatively connected to the clutch pedal 92 by a flexible connection 100. The clutch disengaging and engaging operations of motor 94 are effected by controlling the gaseous pressure within compartments 102 and 104 thereof. To this end a conduit 106 interconnects the motor with an intake manifold 108 of the internal-combustion engine 110 of the vehicle, said manifold serving as a source of vacuum to evacuate the compartment 102 and thus energize the motor to disengage the clutch.

The flow of air from and to the compartments 102 and 104 of the motor is controlled by a valvular unit 112, constituting the essence of the invention of the mechanism of Figure 1.

The valve unit 112 is disclosed in detail in Figures 3 to 8, inclusive, and comprises four parts 114, 116, 118, and 120 disclosed in detail in Figures 4, 5, 6, and 7 respectively.

The remainder of the details of the aforementioned clutch control mechanism may best be described by explaining the operation of the mechanism.

Upon release of an accelerator 122, having a lost motion connection with a throttle 124 by a link 126 and to the valve member 118 by a link 128, the motor 94 is connected to the manifold to thereby disengage the clutch. In this operation air is drawn from the motor through the conduit 106, the air passing through ports 130, 132, 134, and 136 of the valve elements 114, 116, 118, and 120 respectively. When the accelerator is depressed to speed up the engine, the clutch is automatically engaged, the member 118, which may be called a control slide, being moved to the left, Figure 3. Air is then admitted to the compartment 102 of the motor via port 138 of member 114, slot 140 of member 116, slot 142 of member 118, and port 136 of member 120. The ingress of air to the motor serves to initiate an engagement of the clutch, the clutch springs pulling the piston 98 to the right, Figure 2, and at the same time forcing air out of the compartment 104 at a relatively rapid rate via a bore 144 of an end plate 146.

When the clutch plates are about to contact, a tapered portion 148 of a connecting rod 150 functions to cut off the escape of air from the compartment 104 and automatically end the rapid first stage of engagement. The remainder of the engagement of the clutch is effected by controlling the air forced from the compartment 104 via a bleed conduit 152, the air passing to the valve unit 112 and vented to the atmosphere via a port 154 of member 120, a tapered slot 156 in control slide 118, slot 140 in cut-off valve member 116, and port 132 in valve member 114. The rate of egress of air from the compartment 104, and thus the rate of engagement of the clutch, is determined by the degree of depression of the accelerator, the greater the depression, the greater the depth of the tapered port 156 registered with port 154. By moving the cut-off slide 116 to the left, Figure 3, the same being operated by Bowden control 158, the port 132 is moved out of registry with the port 130, thereby rendering the clutch control mechanism inoperative and necessitating the operation of the clutch pedal by the foot.

There is thus provided a clutch control mechanism wherein the clutch is automatically disengaged and engaged upon releasing and depressing the accelerator respectively, the engagement being in two stages of movement, the first relatively rapid and the second relatively slow, the speed of the second or slow stage being in proportion to the degree of depression of the accelerator.

While one illustrative embodiment has been described, it is not our intention to limit the scope of the invention to that particular embodiment, or otherwise than by the terms of the appended claims.

We claim:

1. In a clutch controlling mechanism for an automotive vehicle, a pressure differential operated motor and valve mechanism for controlling said motor, said valve mechanism including four separate ported valve members, two of said members being manually operable slide valves, one of said latter members, flat and rectangular in shape and provided with a relatively long vent slot and two vacuum controlling slots, serving as a three-way valve member and the other of said members, of similar outline and provided with a relatively long vent slot and but one vacuum controlling slot, serving as a cut-off valve member.

2. In a clutch control mechanism for an automotive vehicle, a pressure differential operated motor, a control valve unit for said motor comprising a two-part casing member and two manually operable relatively movable valve members within said casing member, the parts of said unit being so constructed and arranged as to render, at the election of the driver, the clutch control mechanism inoperative or operative to effect both a disengagement of the clutch and an engagement thereof, one of said valve members being provided with three slots, one of said slots being operative only when the other valve member is operated to render the clutch control mechanism inoperative.

HAROLD W. PRICE.
EARL R. PRICE.